US009203766B2

(12) United States Patent
Damola et al.

(10) Patent No.: US 9,203,766 B2
(45) Date of Patent: Dec. 1, 2015

(54) QUALITY OF SERVICE FOR SERVING NODE AND METHOD

(75) Inventors: Ayodele Damola, Solna (SE); Lars Westberg, Enkoping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/127,169

(22) PCT Filed: Jun. 17, 2011

(86) PCT No.: PCT/IB2011/001368
§ 371 (c)(1),
(2), (4) Date: Mar. 26, 2014

(87) PCT Pub. No.: WO2012/172384
PCT Pub. Date: Dec. 20, 2012

(65) Prior Publication Data
US 2014/0219093 A1 Aug. 7, 2014

(51) Int. Cl.
*G01R 31/08* (2006.01)
*H04L 12/851* (2013.01)
*H04L 12/927* (2013.01)
*H04L 12/911* (2013.01)

(52) U.S. Cl.
CPC ........ *H04L 47/2433* (2013.01); *H04L 47/2408* (2013.01); *H04L 47/805* (2013.01); *H04L 47/824* (2013.01)

(58) Field of Classification Search
CPC ....... H04W 28/24; H04W 76/02; H04W 4/00; H04W 72/0486; H04W 72/0433; H04W 88/16; H04L 41/0896
See application file for complete search history.

(56) References Cited

U.S. PATENT DOCUMENTS

| 7,702,739 | B1 | 4/2010 | Cheng et al. | |
| 2003/0009580 | A1* | 1/2003 | Chen et al. | 709/231 |
| 2003/0126286 | A1* | 7/2003 | Lee | 709/238 |
| 2003/0152060 | A1* | 8/2003 | Danneel et al. | 370/342 |
| 2006/0246844 | A1* | 11/2006 | Kroboth et al. | 455/67.11 |

(Continued)

FOREIGN PATENT DOCUMENTS

| EP | 1367783 | 12/2003 |
| WO | WO-2012/052064 | 4/2012 |
| WO | WO-2012/052067 | 4/2012 |

OTHER PUBLICATIONS

PCT International Search Report for PCT Counterpart Application No. PCT/IB2011/001368, (Oct. 10, 2011), 4 pages.

(Continued)

*Primary Examiner* — Jung-Jen Liu
(74) *Attorney, Agent, or Firm* — Nicholson De Vos Webster & Elliott LLP (57) ABSTRACT

A method, computer readable medium and serving node includes an interface configured to exchange data with a user equipment and with a gateway node of a network; and a processor. The processor is configured to implement a classifier function for intercepting a request from the user equipment, and for analyzing whether the request complies with pre-established categorization rules, a request analyzer function for analyzing the request when the request complies with the pre-established categorization rules and for selecting one mode of plural available modes, and an application function for requesting a quality of service, QoS, bearer to be established between the serving node and the user equipment when the selected mode includes a QoS requirement.

20 Claims, 8 Drawing Sheets

(56) References Cited

U.S. PATENT DOCUMENTS

| | | | |
|---|---|---|---|
| 2006/0258353 A1* | 11/2006 | Makela et al. | 455/435.2 |
| 2007/0053331 A1* | 3/2007 | Kolding et al. | 370/338 |
| 2007/0127375 A1* | 6/2007 | Bae et al. | 370/229 |
| 2007/0195788 A1* | 8/2007 | Vasamsetti et al. | 370/395.21 |
| 2008/0107119 A1 | 5/2008 | Chen et al. | |
| 2008/0132269 A1* | 6/2008 | Shen et al. | 455/550.1 |
| 2009/0116439 A1* | 5/2009 | Madan et al. | 370/329 |
| 2009/0285232 A1* | 11/2009 | Lin | 370/412 |
| 2009/0296613 A1* | 12/2009 | Kahn et al. | 370/310 |
| 2010/0080188 A1* | 4/2010 | Ho et al. | 370/329 |
| 2010/0103863 A1* | 4/2010 | Ulupinar et al. | 370/315 |
| 2012/0195275 A1* | 8/2012 | Ghaus et al. | 370/329 |

OTHER PUBLICATIONS

PCT Written Opinion of the International Searching Authority for PCT Counterpart Application No. PCT/IB2011/001368, (Oct. 10, 2011), 7 pages.

"3$^{rd}$ Generation Partnership Project; Technical Specification Group Services and System Aspects; General Packet Radio Service (GPRS) enhancements for Evolved Universal Terrestrial Radio Access Network," http://www.3gpp.org/ftp/specs/archive/23_series/23.401/, (Jun. 2010) 259 pages.

* cited by examiner

QUALITY OF SERVICE FOR SERVING NODE AND METHOD

CROSS-REFERENCE TO RELATED APPLICATIONS

This application is a National stage of International Application No. PCT/IB2011/001368, filed Jun. 17, 2011, which is hereby incorporated by reference.

TECHNICAL FIELD

The present invention generally relates to systems, software and methods and, more particularly, to mechanisms and techniques for providing quality of service capabilities for a radio network controller/serving node in a telecommunication network.

BACKGROUND

In communication networks, the network traffic may be handled according to a type of the traffic (e.g., content) according to Quality of Service (QoS) requirements. For example, network traffic related to a specific service may be directed to a bearer offering a certain QoS level. In this respect, a bearer is considered to be an information transmission context or path of defined characteristics, e.g. capacity, delay and/or bit error rate. Typically, a number of bearers are established between a gateway node of a mobile communication network and a user equipment, e.g., a mobile phone or other type of mobile terminal. A bearer may carry downlink (DL) data traffic in a direction from the network to the user equipment, and may carry data traffic in an uplink (UL) direction from the user equipment to the network. In the gateway node and in the user equipment the data traffic, which includes a plurality of IP data packets (IP: "Internet Protocol", which may be the IP Version 4, also referred to as IPv4, or the IP Version 6, also referred to as IPv6) can be filtered, e.g. using IP 5-tuple packet filters, thereby directing the IP data packets to a desired bearer.

Figure 1:
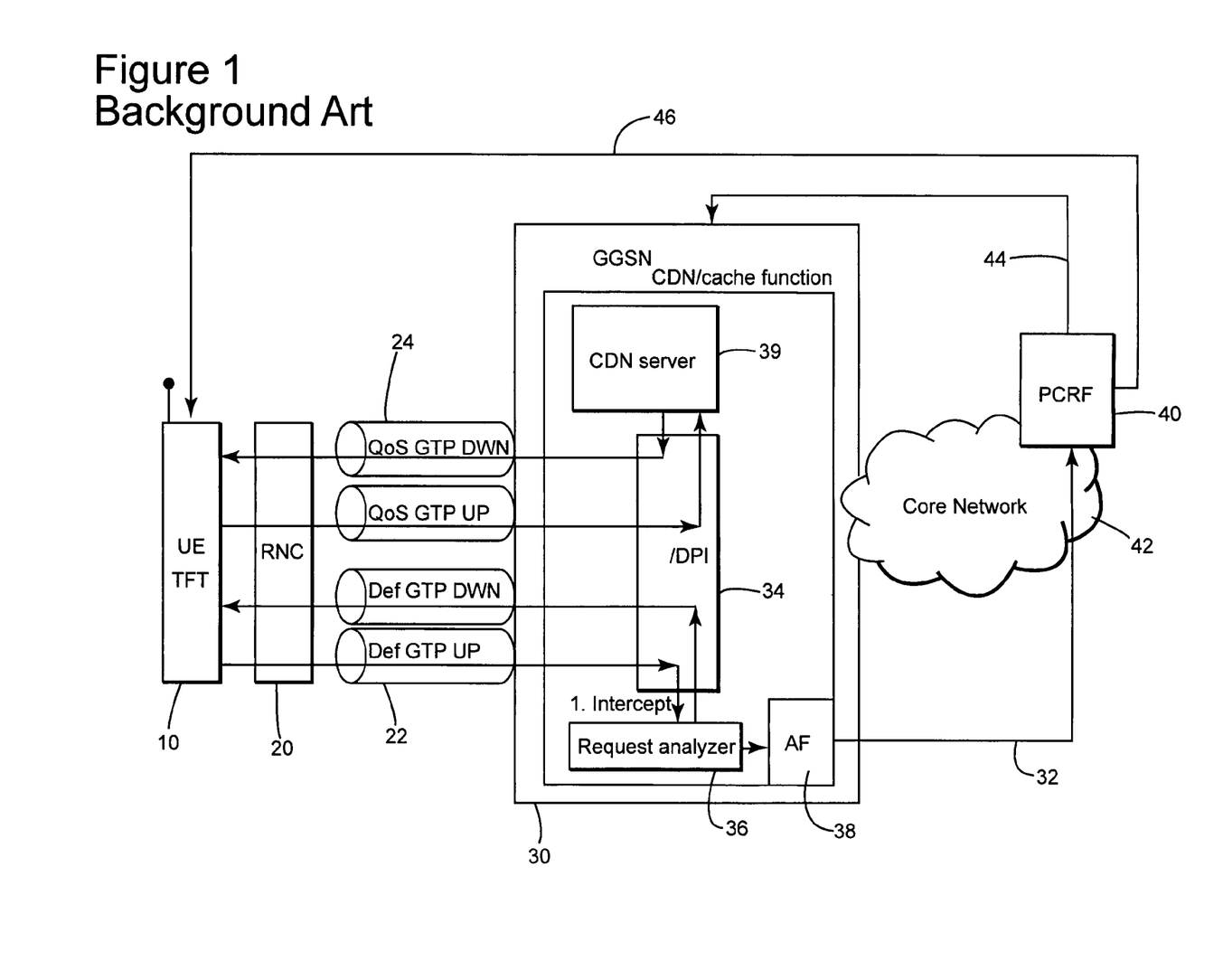
FIG. 1 is a schematic diagram of a traditional communication network.

As shown in FIG. 1, a communication network environment includes a user equipment (UE) 10, which may also be referred to as a terminal, that is connected to a Radio Network Controller (RNC) 20. The RNC 20 is coupled to a gateway 30. The gateway 30 may be a Gateway GPRS Support Node (GGSN) providing a connection of GPRS-based services to one or more external packet data networks. The gateway 30 may also be a System Architecture Evolution Gateway (SAE GW) according to the 3GPP TSs.

In addition, the mobile communication network includes a policy controller 40, which is implemented as a Policy and Charging Rules Function (PCRF) according to the 3GPP TSs. The policy controller 40 may be implemented by dedicated hardware and/or includes software functions executed by a processor. The gateway 30 and the policy controller 40 are typically regarded as components of a core network 42. The policy controller 40 communicates with the gateway 30 via a signaling path 32, which may be implemented using the Gx interface according to the 3GPP TSs. The policy controller 40 may further communicate with other network functions using a control signaling path 44, which may be implemented using the Rx interface according to the 3GPP TSs.

In this context, a user may request from the UE 10 a certain content. The request is sent to the RNC 20 and then via a signaling path 22, which may be a default GPRS tunneling protocol (GTP), to the gateway 30. A deep packet inspection (DPI) module 34, provided inside the gateway 30, is configured to intercept the request from UE 10 and send it to a request analyzer module 36, also provided inside the gateway 30. The request analyzer module 36 determines whether a dedicated bearer needs to be established and depending on a result of this determination, an application function (AF) 38 requests the dedicated bearer with a predetermined QoS from the policy controller 40. As a result of this, the policy controller 40 establishes a second bearer 24 between the gateway 30 and the UE 20. The policy controller 40 uses communication paths 44 and 46 to inform both the gateway 30 and the UE 10 to establish the second bearer 24. Now, the content is received by the UE 10 on the second bearer 24 that has the desired QoS. It is noted that the content that is transferred to the UE 10 resides in a content delivery network (CDN) server 39, which is located inside the gateway 30.

It is noted that new developments in the RNC make possible the delivery of content to the UE directly from the RNC, i.e., the RNC has a CDN function like a cache or an application acceleration server. However, these functionalities situated in the RNC in the current 3GPP architecture cannot be prioritized using existing QoS mechanisms. Thus, there is a need to improve the existing RNC functionalities.

SUMMARY

Assets as, for example, content are desired to be provided to the users from locations that are most suitable to the users. A suitable location may be a location that is closest to the user, e.g., the RNC in a communication network. However, the content comes in various types, with some types requesting, e.g., a movie, a short delay while other types, e.g., email data, being indifferent to the time delay. For this reason, QoS requirements between the user equipment and the RNC need to be implemented.

According to an exemplary embodiment, there is a radio network controller, RNC, in a telecommunication network that can provide desired content to a UE. The RNC includes an interface configured to exchange data with the UE and with a gateway node of the network. The RNC also includes a processor connected to the interface and configured to implement various functionalities related to the desired content. Some of these functionalities include a classifier function for intercepting a request from the user equipment. The request may be related to the desired content. The classifier function can also analyze whether the request complies with pre-established categorization rules. Another functionality includes a request analyzer function for analyzing the request when the request complies with the pre-established categorization rules and for selecting one mode of plural available modes. Each mode is related to performance indicators associated with the desired content. Another functionality is an application function for requesting a quality of service, QoS, bearer to be established between the RNC and the user equipment when the selected mode includes a QoS requirement.

According to another exemplary embodiment, there is a telecommunication network that includes the radio network controller discussed above; a gateway node connected by a first bearer to the RNC; and a policy node connected to the gateway node and configured to provide policy rules for multimedia content being provided in the network.

According to still another exemplary embodiment, there is a method for providing content with various quality of service, QoS, directly from a radio network controller, RNC, in a telecommunicatiori network. The method includes a step of intercepting at the RNC a request from a user equipment, wherein the request is related to a desired content; a step of analyzing the request whether the request complies with pre-established categorization rules; a step of selecting one mode of plural available modes based on information found in the request; a step of requesting a QoS bearer to be established between the RNC and the user equipment when the selected mode includes a QoS requirement; a step of establishing the QoS bearer between the RNC and the user equipment; and a step of providing the desired content to the user equipment from a first cache located in the RNC.

It is an object to overcome some of the deficiencies discussed in the previous section and to provide an RNC that has the capability to directly provide content to the UE and to also provide a gateway that has the capability to establish bearers with the required QoS for the content that is stored at the RNC. One or more of the independent claims advantageously connect the QoS of the network with the CDN server of the RNC and/or a serving node.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of 3GPP QoS mechanism and GGSN. However, the embodiments to be discussed next are not limited to these systems but may be applied to other existing systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, the operator's 3GPP QoS mechanism is connected with a CDN server (cache, application server, etc.) residing in RNC/serving node (i.e., below the GGSN). Further, the operator of the network has tools for handling content delivery. According to an aspect of the invention, the operator of the network can select the appropriate method for content delivery based on the requirements or key performance indicators (KPIs) of the content. It is noted that the novel features may apply to other systems, for example, LTE. In this case, the CDN function resides in the eNodeB. Thus, for this application, the generic term "serving node" is considered to include the RNC, or eNodeB or similar elements that vary from system to system. For simplicity, the following paragraphs refer to RNC/serving node.

As discussed above, prioritized connectivity based on QoS may be established for content served from a CDN function residing in the GGSN in the core network. According to the above discussed exemplary embodiment, similar prioritized connectivity based on QoS may be established for content served from a CDN function residing in the RNC/serving node. Thus, according to another exemplary embodiment, the operator has the ability to select how and when to best use these methods. Other alternatives are to only serve content from either the GGSN or from the RNC/serving node. These alternatives enable content to be served with certain performance indicators of KPIs. The KPIs could include: latency or round trip time (RTT) and traffic load on the network.

Figure 2:
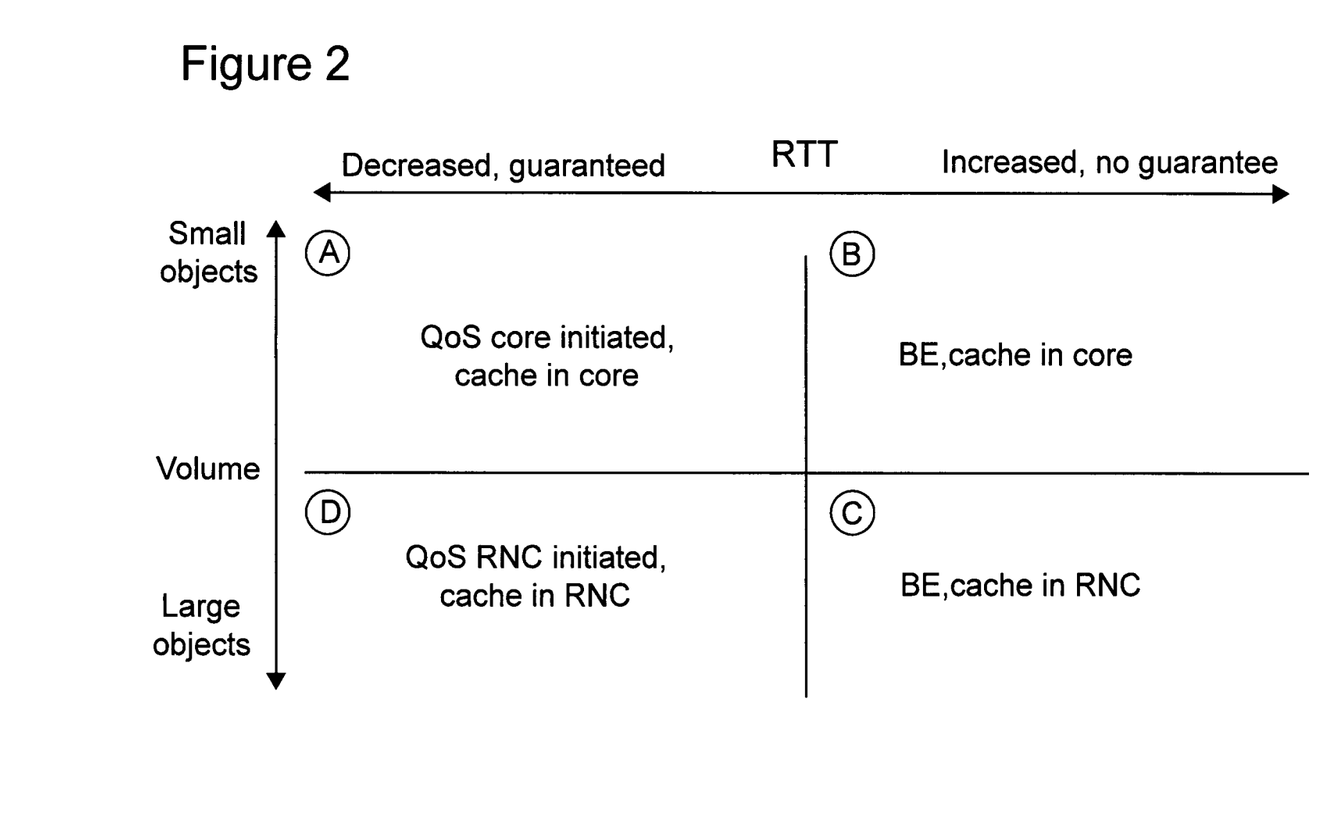
FIG. 2 is a schematic diagram of various modes for handling content in a communication network according to an exemplary embodiment.

According to an exemplary embodiment, the modes (alternatives) available to an operator, based on the possibilities to serve content from the RNC or the serving node, may be grouped as shown in FIG. 2. FIG. 2 shows four modes A to D ranked based on RTT on the X axis and a volume of the item on the Y axis. According to mode A, the QoS mechanism is core network initiated and the cache is collocated in the core network. According to mode B, there is no QoS, only best effort (BE) delivery is provided, and the cache is in the core network. According to mode C, BE delivery is provided, and the cache is provided in the RNC. According to mode D, QoS is initiated in the RNC, and the cache is also provided in the RNC.

When the cache is provided in the core network, it results in more traffic over the backhaul and this approach is suitable for small objects. When the cache is provided in the RNC, it is suitable for large objects which would create high load in the backhaul. By using the QoS mechanism, it provides a guarantee in terms of latency, which might be important for some type of content.

In order to know what mode to offer for each content, the operator of the network assigns, for every item stored in the CDN, a value for the RTT with which the item should be served to the UE. This assignment may be based on the traffic type. For example, for delay sensitive content like video streaming, the RTT is low, while for a large file download a high RTT may be acceptable. The volume of the traffic generated by an item determines if the item should be served from the GGSN or from closer to the end user, e.g., the RNC. For large objects it is preferred to serve the content from the RNC/serving node while for smaller objects it is preferred to serve them from the GGSN. It is noted that other modes may be envisioned if different or additional KPIs are used instead of RTT and volume.

Figure 3:
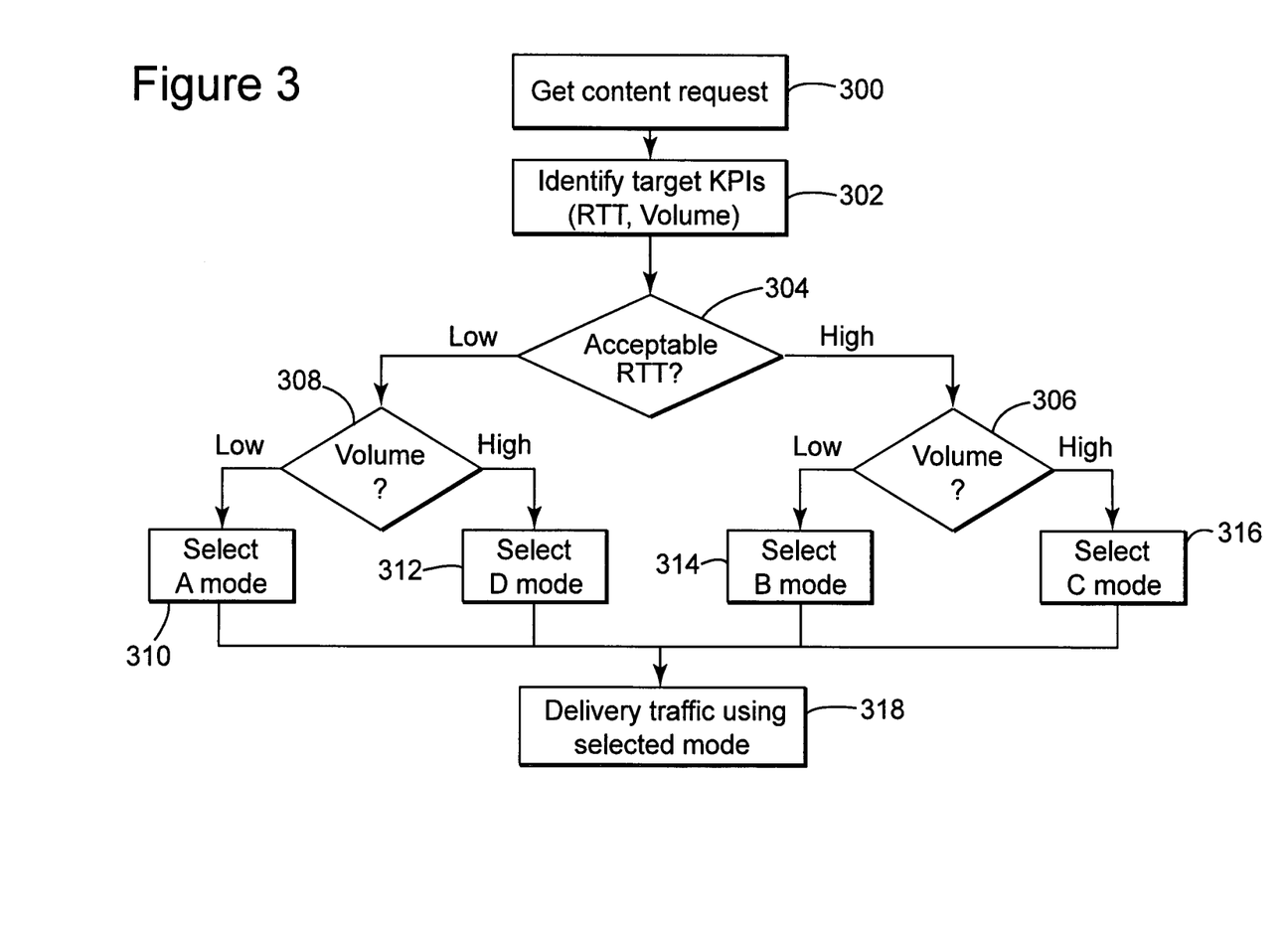
FIG. 3 is a flow chart of a method for selecting one mode of various nodes for handling content in a communication network according to an exemplary embodiment.

A method for selecting the delivery mode of a desired item is now discussed with regard to FIG. 3. A functionality for selecting the appropriate mode may be implemented at the RNC, serving node, and/or core network in a dedicated hardware or in software or a combination of them. The method includes a step 300 of receiving the content request from the UE. In step 302, target KPIs of the content are identified, for example, RTT and volume. Then, in step 304 a determination is made with regard to the RTT requirement of the desired item. If the RTT request is high (i.e., the application is able to tolerate a high delay), the method advances to step 306, otherwise (i.e., the application does not tolerate high delay) to step 308. In both steps 306 and 308, a determination of the volume of the desired item is made. Depending on the size of the volume, one of the four modes is selected in steps 310 to 316. Based on the selected mode, the requested traffic delivery is implemented in step 318. Next, the novel structure of the communication network and how the QoS is initiated when the desired item is stored at the RNC is discussed.

Figure 4:
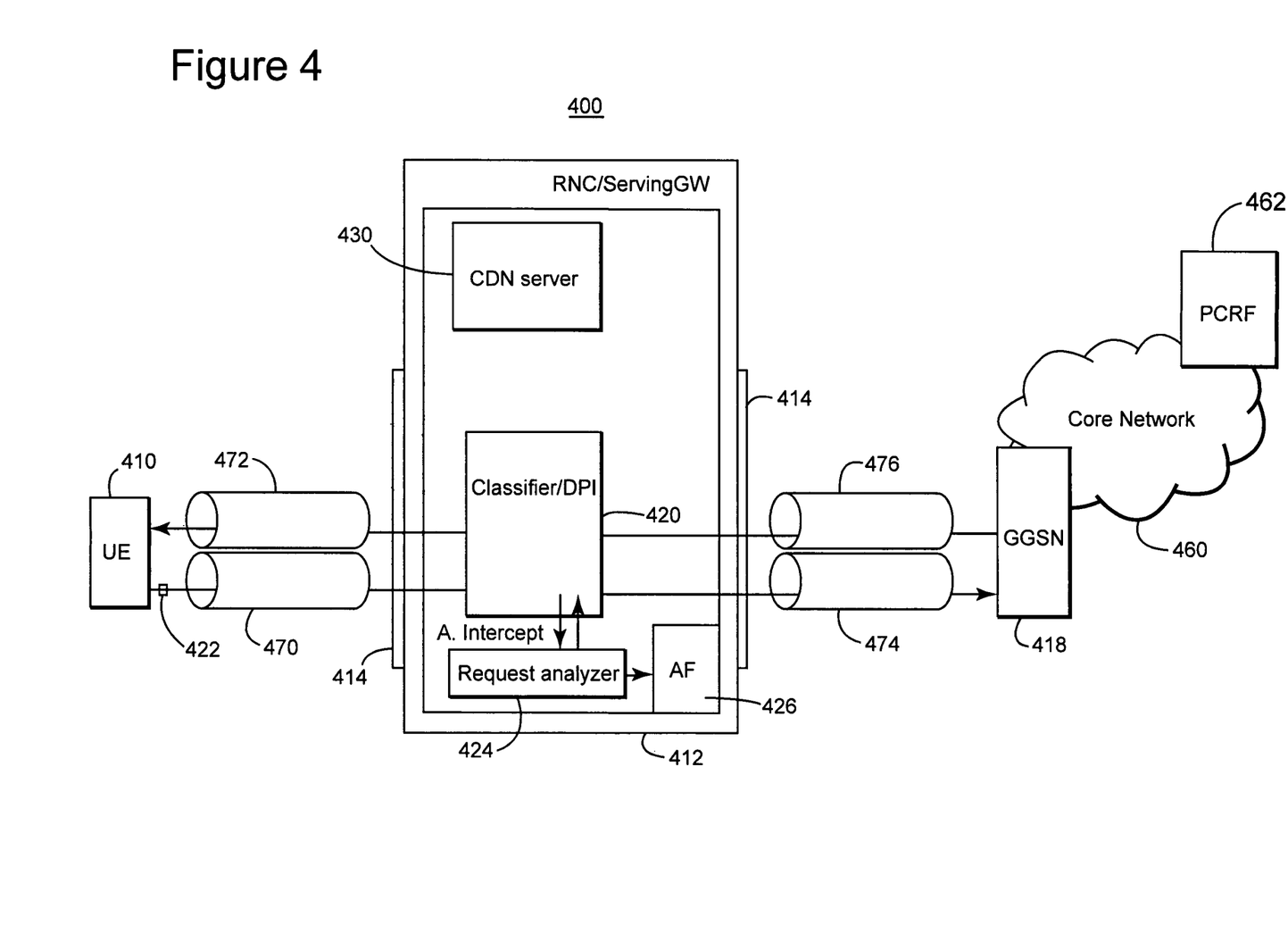
FIG. 4 is a schematic diagram of an RNC/serving node enhanced with a new functionality according to an exemplary embodiment.

According to an exemplary embodiment illustrated in FIG. 4, there is a communication network 400 to which a UE 410 is connected. More specifically, the communication network includes an RNC or a serving node depending on the type of network. As the functionalities to be discussed next can be implemented to either one of these two elements, in the following, the specification refers to RNC/serving node 412. An interface 414 handles data exchanged between the UE 410 and the RNC/serving node 412. The RNC/serving node 412 communicates with the GGSN 418, which is part of the core network 460. The core network 460 also includes a policy controller 462. The policy controller 462 may be the Policy and Charging Rules Function (PCRF) according to the 3GPP TSs.

The RNC/serving node 412 may include a classifier function 420 for intercepting a request 422 from the UE 410. The request 422 is related to a desired content. The classifier function 420 is configured to analyze whether the request complies with pre-established categorization rules, as will be discussed later. The RNC/serving node 412 also includes a request analyzer function 424 for analyzing the request 422 and for selecting one mode of plural available modes as discussed with regard to FIG. 2. The RNC/serving node 412 further includes an application function (AF) 426 for requesting a QoS bearer to be established between the RNC/serving node 412 and the UE 410 when the selected mode includes a QoS requirement. The desired content is stored in a CDN server 430 that is provided in the RNC/serving node 412 and not in the GGSN 418.

When in operation, the communication network 400 shown in FIG. 4 is configured to process the request 422 from the UE 410 as follows. The request 422 is sent from the UE 410 to the RNC/serving node 412 along a default first uplink bearer 470, e.g., default radio access bearer. A default downlink bearer 472 is also available for communications between the UE 410 and the RNC/serving node 412.

The classifier function 420 intercepts in step A the request 422 and determines, looking at the IP-packets transported in the first bearer 470, and based on certain classification rules, whether the request should continue its way to the GGSN 418 along bearer 474 or the request should be broke-out. If a determination is made to broke-out the request, the request is sent to the request analyzer function 424 for determining which QoS mode should be used for sending the desired content to the UE 410. The modes A to D were discussed with regard to FIG. 2. Thus, the method discussed with regard to FIG. 3 may be used here to determine what QoS requirements are necessary for the desired content.

If it is determined by the request analyzer function 424 that a "request for content" or similar field is present in the request 422, the request analyzer function 424 triggers the application function 426. The AF 426 then generates a trigger in step B for network initiated QoS-bearer establishment. The exact establishment of the QoS bearer depends of the type of system, e.g., one possibility is described in 3GPP-standards 3GPP TS 23.401 23401-950.

Figure 5:
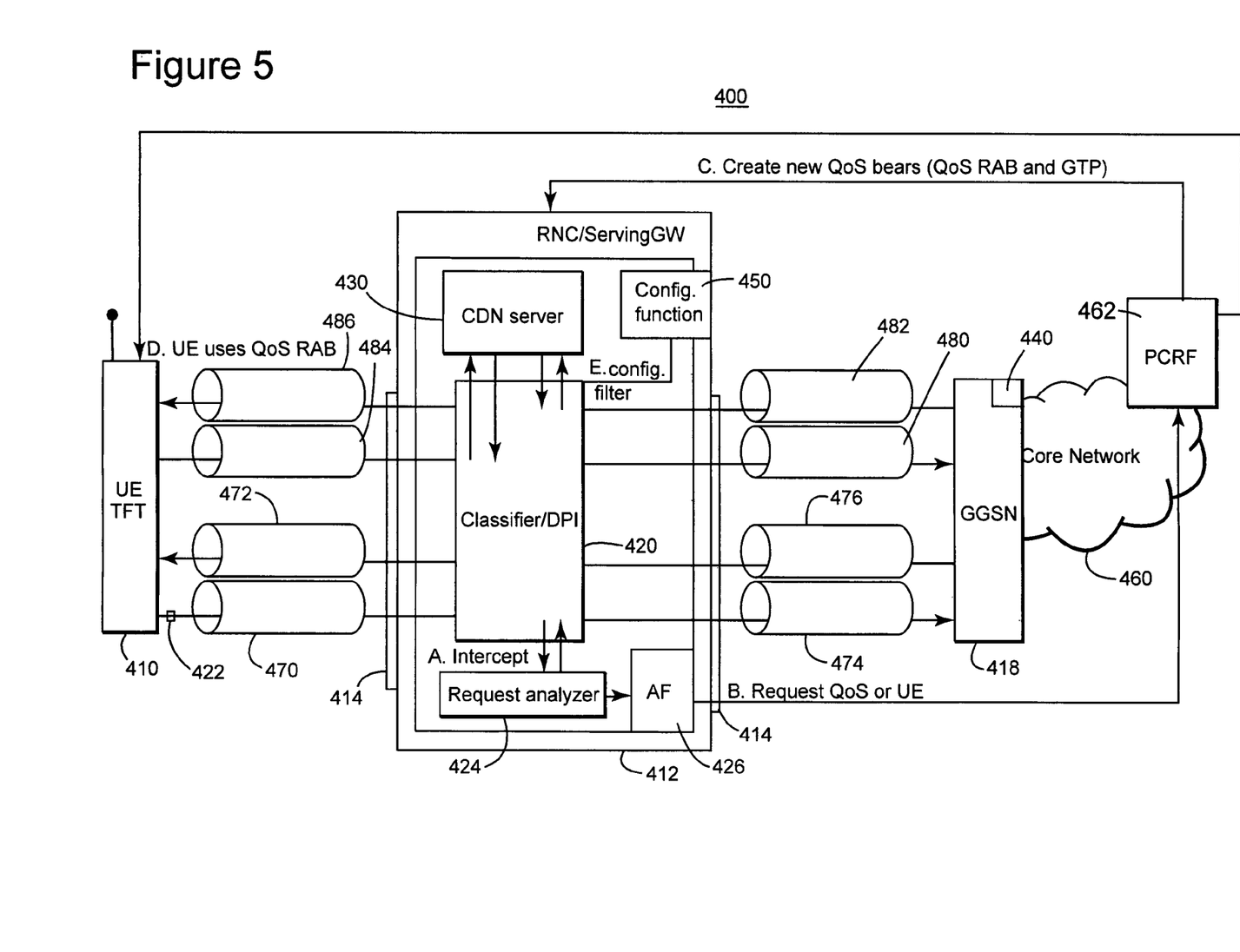
FIG. 5 is a schematic diagram of an RNC/serving node having a cache according to an exemplary embodiment.

FIG. 5 illustrates how the AF 426 sends in step B the QoS request for UE to the policy controller 462. The policy controller 462 informs the RNC/serving node 412 in step C about the creation of new QoS bearers 480 and 482 between the GGSN 418 and the RNC/serving node 412. The policy controller 462 also informs in step D the UE 410 about new QoS bearers 484 and 486 between the UE 410 and the RNC/serving node 412. The newly formed bearers 480 to 486 are used for delivering the desired content to the UE 410. After the establishment of the new (second) QoS-bearer 484, the classifier function 420 is applied to the QoS-bearer 484 such that the desired content is delivered from the local CDN-server 430 and not from a CDN-server 440 of the GGSN 418. The traffic from the UE which is related to the second QoS-bearer 484 may use a Traffic Flow Template (TFT). The TFT indicates how various bearers should be associated with various information.

FIG. 5 also shows a configuration function 450 that may be implemented at the RNC/serving node 412. The configuration function 450 may be used to control the pre-established categorization rules, e.g., to modify them as shown in step E. In this way, the functionality of the classifier function may be changed by the operator as desired.

Figure 6:
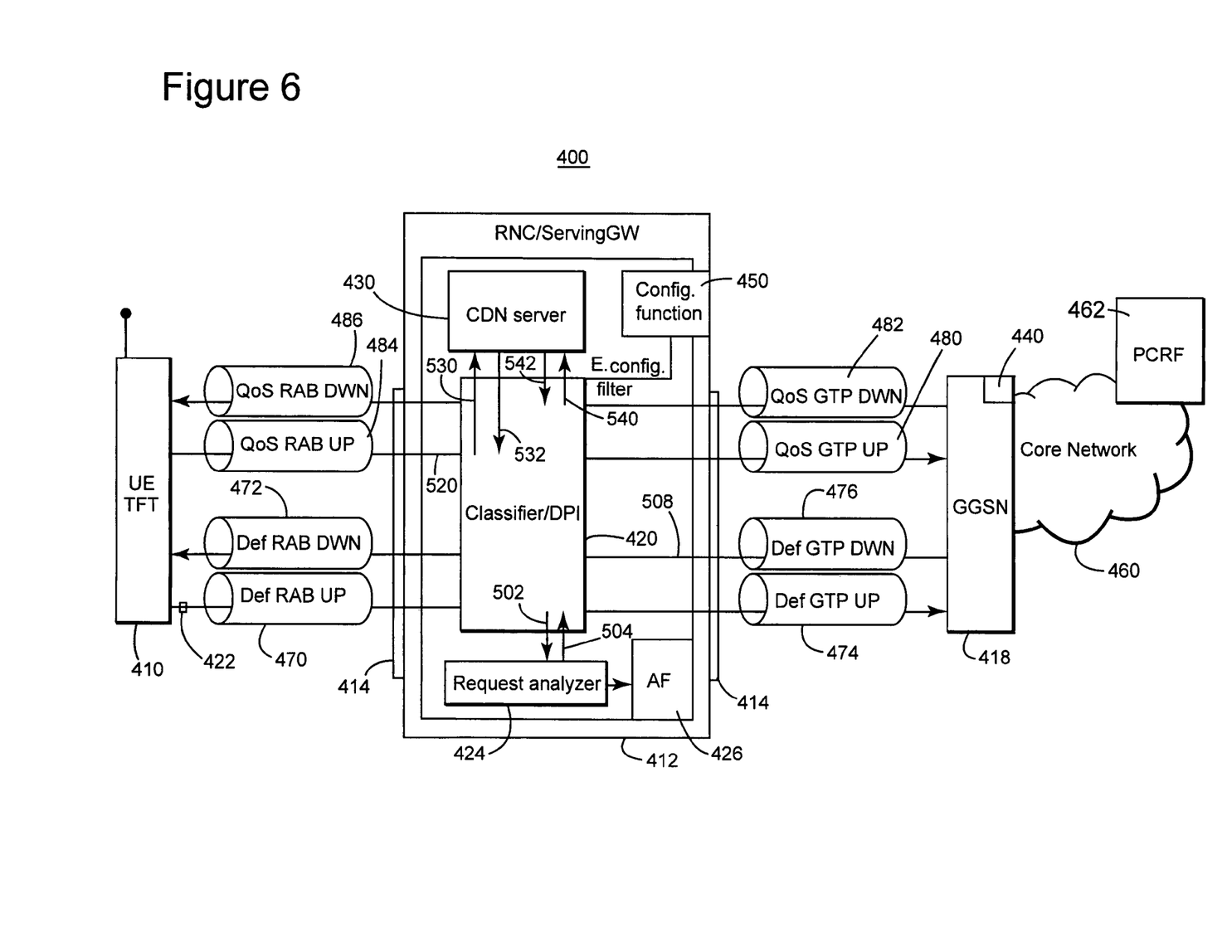
FIG. 6 is a schematic diagram of an RNC/serving node and signals exchanged with a user equipment and a GGSN according to an exemplary embodiment.

FIG. 6 shows the communication network 400 and also the various signaling exchanges taking place between the UE 410, the RNC/serving node 412 and the GGSN 418. The request 422 is sent along the default (first) bearer 470 to the RNC/serving node 412. Here the request is intercepted by the classifier function 420. The classifier function 420 extracts the traffic from the path 470 and the traffic including the request is sent along communication path 502 to the request analyzer function 424 if the traffic meets a certain criteria (e.g., it an http message) or along bearer 474 to the GGSN if it does not meet the criteria. The GGSN 418 provides a reply along default bearer 476, 508, 472 to the UE 410 for the traffic that does not meets the criteria noted above. In other words, the classifier function 420 extracts only traffic that may require downloading content from a server (e.g., CDN server 430) and allows the remaining traffic to follow the established path. In one application, the request analyzer 424 function determines whether the extracted traffic requests content from the CDN server 430 or another CDN server. If the content is not present in the CDN server 430, the traffic is sent along communication path 504 and 474 to the GGSN 418.

Supposing that the AF 426 has triggered the establishment of the second bearer 484, 520, and 480, and the second bearer has been established, the UE 410 receives the desired content from the CDN server 430 along the newly established second bearer 484. It is noted that for the above discussed situation, parts of the first and second bearers may not be needed, e.g., 474, 476, 480, 482. However, the first and second bearers are established between the UE 410 and the GGSN 418 as the existent telecommunication networks are configured in this way. However, the novel features discussed herein may be applied to other telecommunication networks that do not establish the first and second bearers between the UE and the GGSN but only between the UE and the serving node i.e. between the necessary parts of the network. Once the second bearer is established between the UE and the RNC/serving node 412, a next request for content from the CDN server 430 may be sent along communication path 484, 520, 530, 532 etc. instead of the first bearer.

Figure 7:
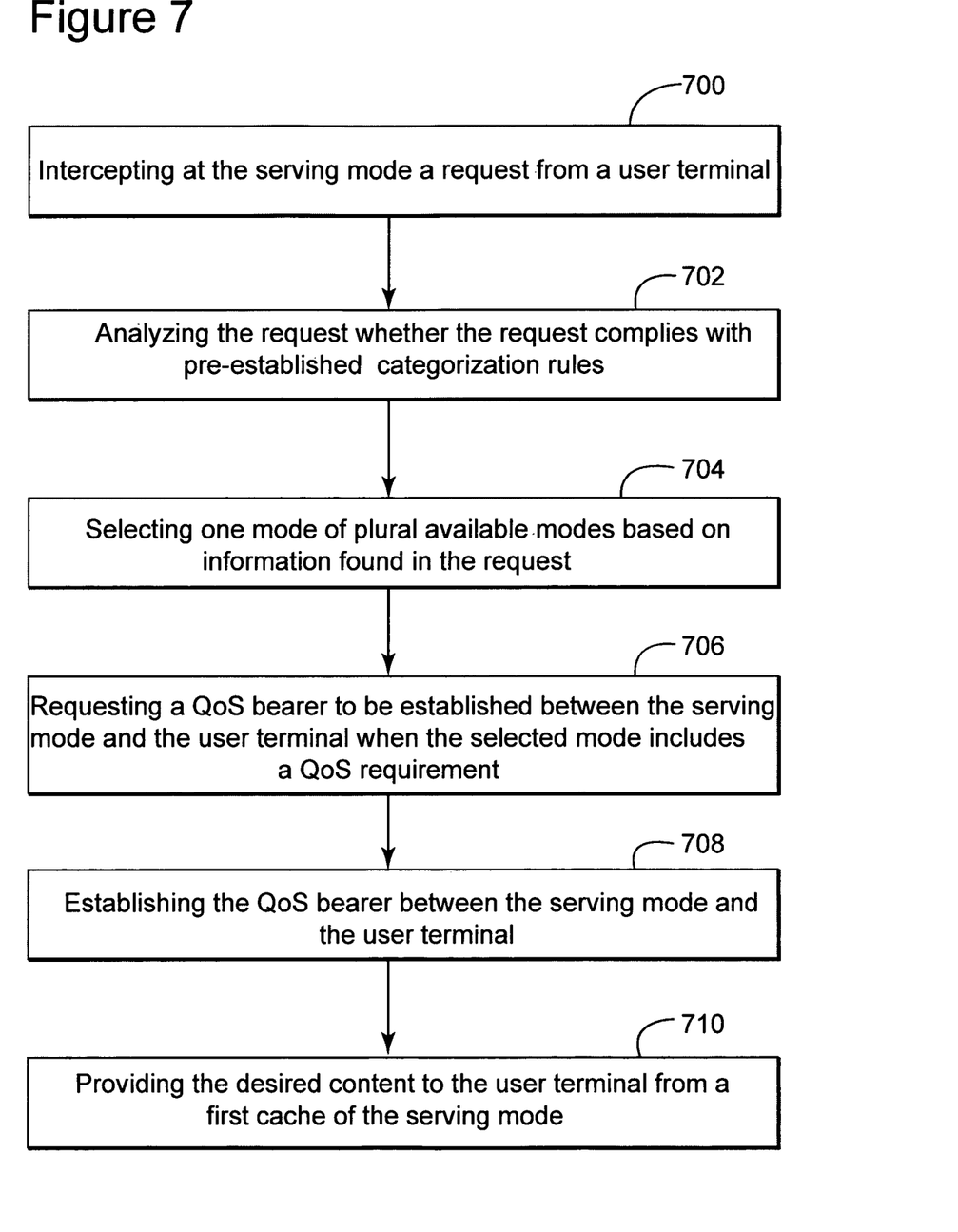
FIG. 7 is a flow chart of a method for handling desired content provided by the RNC/serving node according to an exemplary embodiment.

According to an exemplary embodiment illustrated in FIG. 7, there is a method for providing content with various quality of service, QoS, directly from a serving node (412) in a telecommunication network (400). The method includes a step 700 of intercepting at the serving node (412) a request (422) from a user equipment (410), wherein the request (422) is related to a desired content; a step 702 of analyzing the request (422) whether the request complies with pre-established categorization rules; a step 704 of selecting one mode of plural available modes based on information found in the request (422), wherein each mode is related to performance indicators associated with the desired content; a step 706 of requesting a QoS bearer to be established between the serving node (412) and the user equipment (410) when the selected mode includes a QoS requirement; a step 708 of establishing the QoS bearer between the serving node (412) and the user equipment (410); and a step 710 of providing the desired content to the user equipment (410) from a first cache (430) of the serving node (412).

The method may optionally include, the steps of implementing a request analyzer function (424) in the serving node (412) to analyze whether the request (422) includes a request for content; and implementing an application function (426) in the serving node (412) to send a trigger to a gateway node (418) of the network for initiating the QoS bearer. The method also may include the step of selecting the mode for the desired content based on one or more of a latency, round trip time, or traffic load parameters in the network or storing in the first cache (430) in the serving node (412) the desired content. Still, the method may select a mode from four predefined modes, where the four predefined modes include a first mode characterized by the QoS being initiated by the network (400) and a second cache (440) to provide the desired content being outside the serving node (412), a second mode characterized by the second cache (440) to provide the desired content being outside the serving node (412), a third mode characterized by the first cache (430) to provide the desired content being inside the serving node (412), and a fourth mode characterized by the first cache (430) to provide the desired content being inside the serving node (412) and the QoS being initiated by the serving node.

Figure 8:
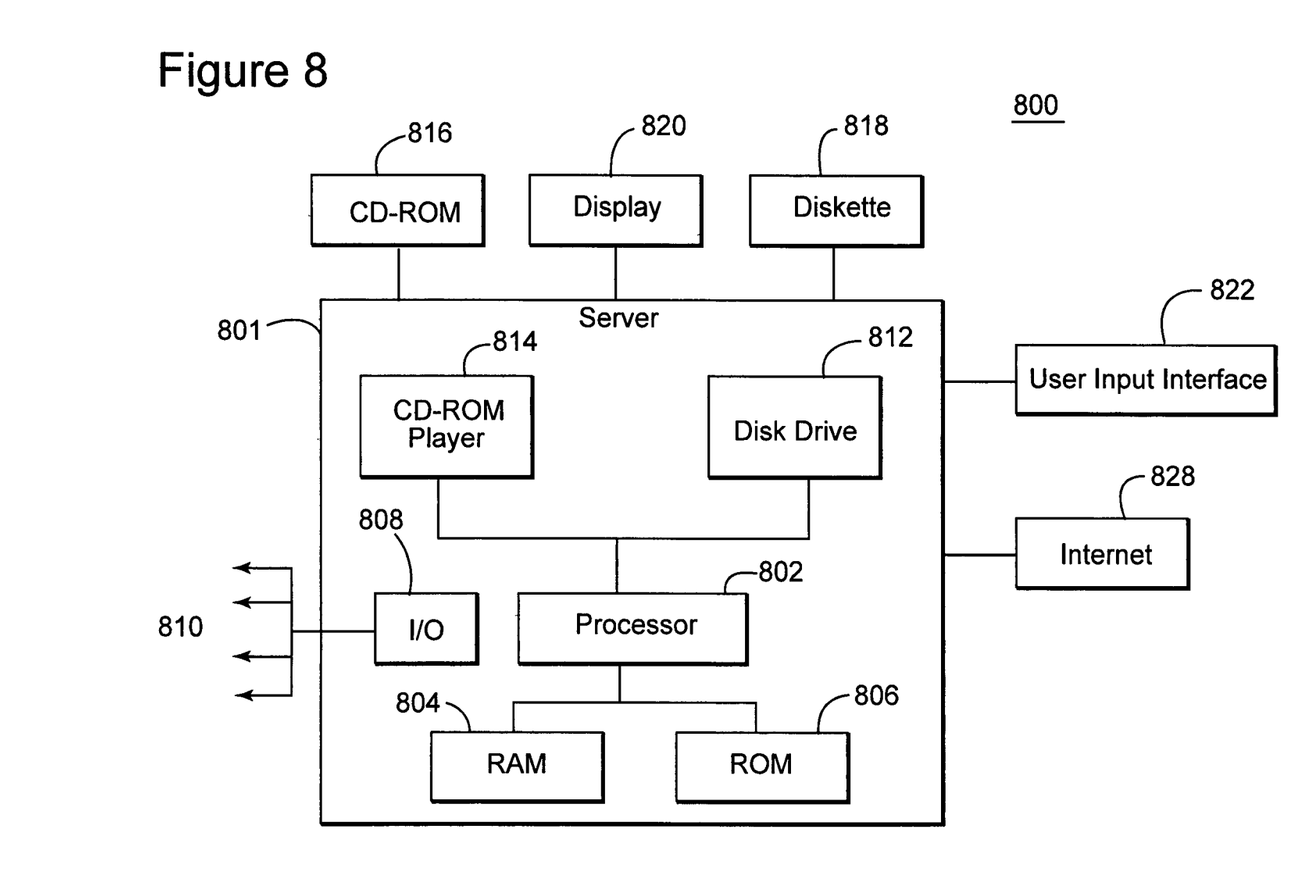
FIG. 8 is a schematic diagram of a computing device that implements the functionality shown in FIG. 7.

An example of a representative computing system capable of carrying out operations in accordance with the RNC and/or serving node of the exemplary embodiments is illustrated in FIG. 8. Hardware, firmware, software or a combination thereof may be used to perform the various steps and operations described herein. The computing structure 800 of FIG. 8 is an exemplary computing structure that may be used in connection with such a system.

The exemplary computing arrangement 800 suitable for performing the activities described in the exemplary embodiments may include server 801. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as is known in the art, as dictated by software and/or firmware instructions.

The server 801 may also include one or more data storage devices, including hard and floppy disk drives 812, CD-ROM drives 814, and other hardware capable of reading and/or storing information such as DVD, etc. In one embodiment, software for carrying out the above discussed steps may be stored and distributed on a CD-ROM 816, diskette 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touch pad, touch screen, voice-recognition system, etc.

The server 801 may be coupled to other computing devices, such as landline and/or wireless terminals, via a network. The server may be part of a larger network configuration as in a global area network (GAN) such as the Internet 828, which allows ultimate connection to the various landline and/or mobile client/watcher devices.

The disclosed exemplary embodiments provide an RNC, node, system, method and a computer program product for providing the operator of the network with the capability to supply content with desired QoS from the RNC or a serving node. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A serving node in a telecommunication network, the serving node comprising:
an interface configured to exchange data with a user equipment and with a gateway node of the network; and
a processor connected to the interface and configured to implement:
a classifier function for intercepting a request from the user equipment, wherein the request is related to a desired content, and for analyzing whether the request complies with pre-established categorization rules,
a request analyzer function for analyzing the request when the request complies with the pre-established categorization rules and for selecting one mode of a plurality of available modes, wherein each mode is related to performance indicators associated with the desired content, and wherein the plurality of available modes includes at least a mode characterized by a first cache to provide the desired content being inside the serving node, and
an application function for requesting a quality of service (QoS) bearer to be established between the serving node and the user equipment when the selected mode includes a QoS requirement; and
wherein the interface is configured to send the QoS bearer request to the gateway node.

2. The serving node of claim 1, wherein the request analyzer function analyzes whether the request includes a content request and the application function sends a trigger to the gateway node for initiating the QoS bearer.

3. The serving node of claim 1, wherein the processor is further configured to select the mode for the desired content based on one or more of a latency, round trip time, or traffic load parameters in the network.

4. The serving node of claim 1, further comprising:
the first cache connected to the processor and configured to store the desired content.

5. The serving node of claim 4, wherein the plurality of available modes includes four predefined modes, and the mode characterized by the first cache to provide the desired content being inside the serving node is a third mode and wherein the four predefined modes further include:
a first mode characterized by the QoS bearer being initiated by the network and a second cache to provide the desired content being outside the serving node,
a second mode characterized by the second cache to provide the desired content being outside the serving node, and
a fourth mode characterized by the first cache to provide the desired content being inside the serving node and the QoS bearer being initiated by the serving node.

6. The serving node of claim 1, wherein the processor is configured to implement a configuration function, and wherein the configuration function controls the pre-established categorization rules.

7. The serving node of claim 1, wherein the serving node is a radio network controller or an eNodeB.

8. A telecommunication network comprising:
a serving node;
a gateway node connected by a first bearer to the serving node; and
a policy node connected to the gateway node and configured to provide policy rules for multimedia content being provided in the network; and
wherein the serving node comprises:
an interface configured to exchange data with a user equipment and with the gateway node, and
a processor connected to the interface and configured to implement:
a classifier function for intercepting a request from the user equipment, wherein the request is related to a desired content, and for analyzing whether the request complies with pre-established categorization rules,
a request analyzer function for analyzing the request when the request complies with the pre-established categorization rules and for selecting one mode of a plurality of available modes, wherein each mode is related to performance indicators associated with the desired content and wherein the plurality of available modes includes at least a mode characterized by a first cache to provide the desired content being inside the serving node, and
an application function for requesting a quality of service (QoS) bearer to be established between the serving node and the user equipment when the selected mode includes a QoS requirement, and
wherein the interface is configured to send the QoS bearer request to the gateway node.

9. The network of claim 8, wherein the request analyzer function analyzes whether the request includes a content request and the application function sends a trigger to the gateway node for initiating the QoS bearer.

10. The network of claim 8, wherein the processor is further configured to select the mode for the desired content based on one or more of a latency, round trip time, or traffic load parameters in the network.

11. The network of claim 8, further comprising:
the first cache connected to the processor and configured to store the desired content.

12. The network of claim 11, wherein the plurality of available modes includes four predefined modes, and the mode characterized by the first cache to provide the desired content being inside the serving node is a third mode and wherein the four predefined modes further include:
a first mode characterized by the QoS bearer being initiated by the network and a second cache to provide the desired content being outside the serving node,
a second mode characterized by the second cache to provide the desired content being outside the serving node, and
a fourth mode characterized by the first cache to provide the desired content being inside the serving node and the QoS bearer being initiated by the serving node.

13. The network of claim 11, wherein the processor is further configured to supply the desired content from the first cache directly to the user equipment.

14. The network of claim 8, wherein the processor is configured to implement a configuration function, and wherein the configuration function controls the pre-established categorization rules.

15. A method for providing content with various quality of service (QoS) directly from a serving node in a telecommunication network, the method comprising:
intercepting at the serving node a request from a user equipment, wherein the request is related to a desired content;
analyzing the request to determine whether the request complies with pre-established categorization rules;
selecting one mode of a plurality of available modes based on information found in the request, wherein each mode is related to performance indicators associated with the desired content, and wherein the plurality of available modes includes at least a mode characterized by a first cache to provide the desired content being inside the serving node;
requesting a QoS bearer to be established between the serving node and the user equipment when the selected mode includes a QoS requirement;
establishing the QoS bearer between the serving node and the user equipment; and
providing the desired content to the user equipment from the first cache of the serving node.

16. The method of claim 15, further comprising:
  implementing a request analyzer function in the serving node to analyze whether the request includes a content request; and
  implementing an application function in the serving node to send a trigger to a gateway node of the network for initiating the QoS bearer.

17. The method of claim 15, further comprising:
  selecting the mode for the desired content based on one or more of a latency, round trip time, or traffic load parameters in the network.

18. The method of claim 15, further comprising:
  storing in the first cache in the serving node the desired content.

19. The method of claim 15, wherein the mode is selected from four predefined modes, and the mode characterized by the first cache to provide the desired content being inside the serving node is a third mode, and wherein the four predefined modes further include:
  a first mode characterized by the QoS bearer being initiated by the network and a second cache to provide the desired content being outside the serving node,
  a second mode characterized by the second cache to provide the desired content being outside the serving node, and
  a fourth mode characterized by the first cache to provide the desired content being inside the serving node and the QoS bearer being initiated by the serving node.

20. A non-transitory computer readable medium including computer executable instructions, wherein the instructions, when executed, implement a method for providing content with various quality of service (QoS) directly from a serving node in a telecommunication network, the method comprising:
  intercepting at the serving node a request from a user equipment, wherein the request is related to a desired content;
  analyzing the request to determine whether the request complies with pre-established categorization rules;
  selecting one mode of a plurality of available modes based on information found in the request, wherein each mode is related to performance indicators associated with the desired content, and wherein the plurality of available modes includes at least a mode characterized by a first cache to provide the desired content being inside the serving node;
  requesting a QoS bearer to be established between the serving node and the user equipment when the selected mode includes a QoS requirement;
  establishing the QoS bearer between the serving node and the user equipment; and
  providing the desired content to the user equipment from a first cache of the serving node.

* * * * *

UNITED STATES PATENT AND TRADEMARK OFFICE
CERTIFICATE OF CORRECTION

| | | |
|---|---|---|
| PATENT NO. | : 9,203,766 B2 | Page 1 of 1 |
| APPLICATION NO. | : 14/127169 | |
| DATED | : December 1, 2015 | |
| INVENTOR(S) | : Damola et al. | |

It is certified that error appears in the above-identified patent and that said Letters Patent is hereby corrected as shown below:

Specification

In Column 2, Line 9, delete "UE 20." and insert -- UE 10. --, therefor.

In Column 2, Line 64, delete "telecommunicatiori network." and insert -- telecommunication network. --, therefor.

Signed and Sealed this
Fifteenth Day of March, 2016

Michelle K. Lee
*Director of the United States Patent and Trademark Office*